July 23, 1940.   J. E. BROWNING   2,208,719
FUEL SUPPLY AND IGNITING MEANS FOR WATER HEATERS
Filed Feb. 1, 1938   3 Sheets-Sheet 1
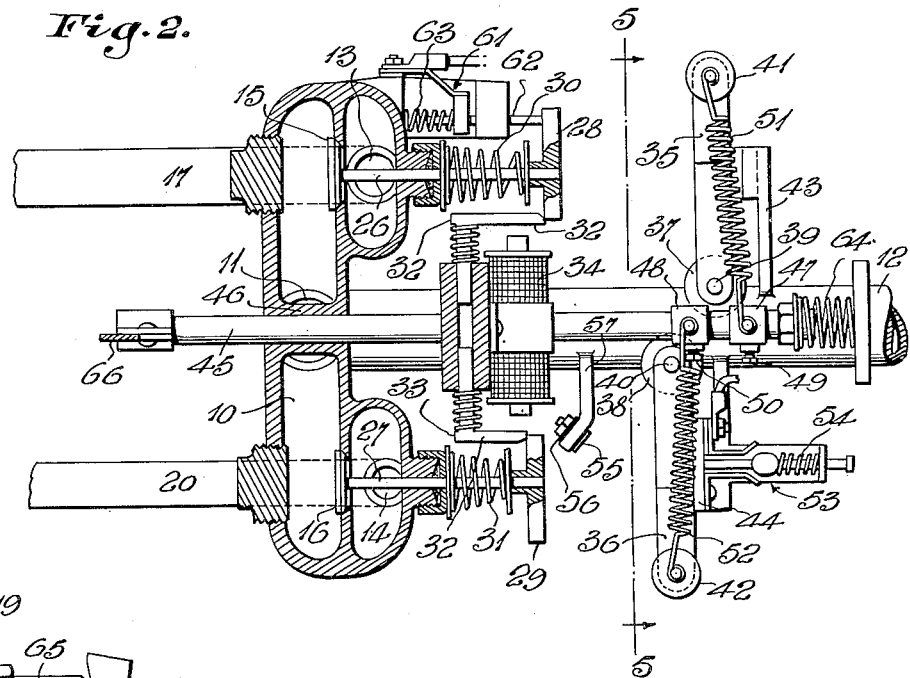
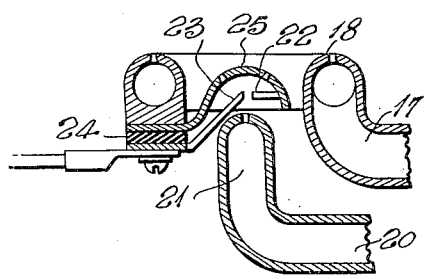
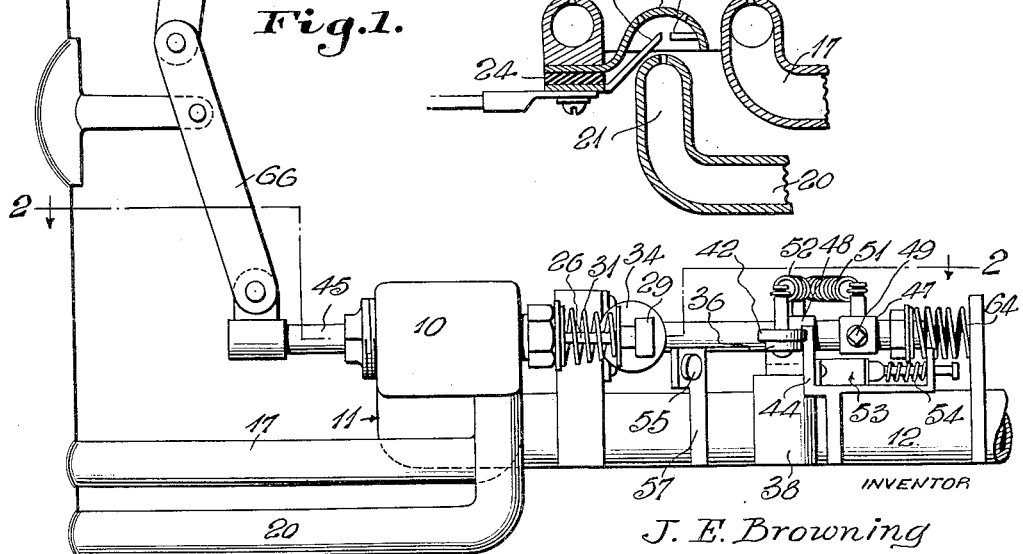
INVENTOR
J. E. Browning
WITNESS
H. Woodard
By H. B. Wilson &co
Attorneys July 23, 1940. J. E. BROWNING 2,208,719
FUEL SUPPLY AND IGNITING MEANS FOR WATER HEATERS
Filed Feb. 1, 1938   3 Sheets-Sheet 2

Inventor
J. E. Browning

WITNESS
H. Woodard

By H. Brownson &co
Attorneys

July 23, 1940.　　　　J. E. BROWNING　　　　2,208,719
FUEL SUPPLY AND IGNITING MEANS FOR WATER HEATERS
Filed Feb. 1, 1938　　　3 Sheets-Sheet 3
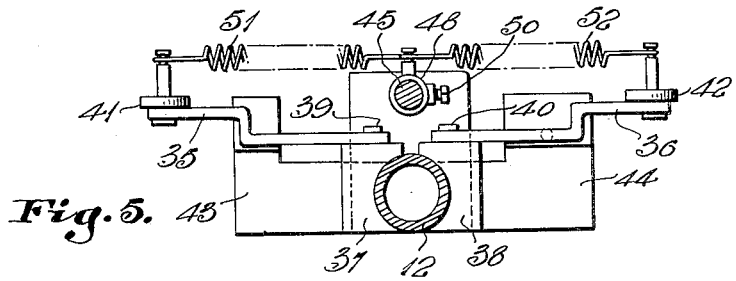
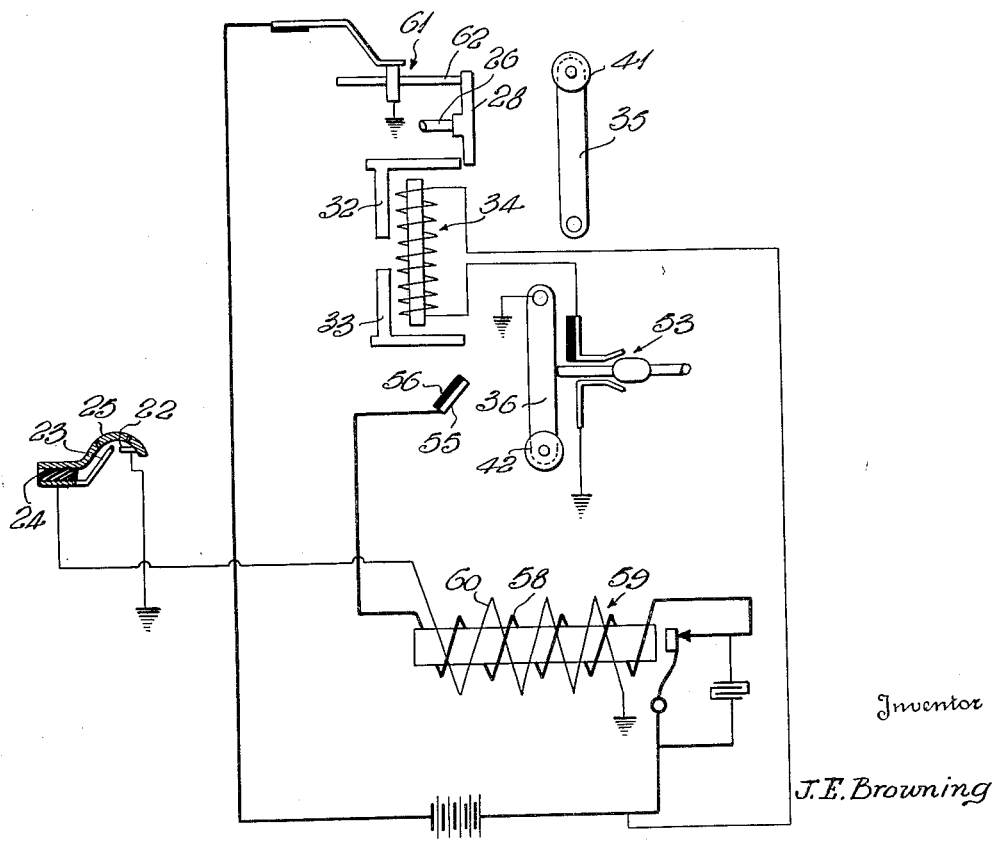
Inventor
J. E. Browning Patented July 23, 1940

2,208,719

UNITED STATES PATENT OFFICE 2,208,719

FUEL SUPPLY AND IGNITING MEANS FOR WATER HEATERS

James E. Browning, San Antonio, Tex., assignor, by direct and mesne assignments, to Browning Laboratories, Inc., a corporation of Texas Application February 1, 1938, Serial No. 188,159

14 Claims. (Cl. 158—117.1)

The invention aims primarily to provide a new and improved mechanism, readily operable by means of a thermostat, for automatically admitting fuel to a burner of a water heater and lighting said burner when the water temperature lowers to a predetermined extent, and for shutting off the supply of fuel from the burner when the water has been heated to the required temperature.

In carrying out the above end, one valve controls the flow of fuel to the main burner, another valve controls the fuel flow to an igniting burner for said main burner, and electrical ignition means is provided for said igniting burner, and a further object is to make novel provision for opening the fuel valve of said igniting burner and closing the circuit of said ignition means to ignite said igniting burner, for then opening the fuel valve of said main burner to cause the latter to be lighted by said igniting burner, and for then breaking the circuit of said ignition means.

A further object is to provide for safely locking both valves in their closed positions and for electrically releasing said locking means immediately prior to valve opening.

Yet another object is to make novel provision for operating the valves and the necessary switches by means of a simple and efficient snap-action mechanism.

With the foregoing and other objects which will become apparent as the description proceeds, the invention resides in the novel subject matter hereinafter described and claimed, description being accomplished by reference to the accompanying drawings.

Fig. 1 is a side elevation showing the association of the invention with part of a hot water heater having a thermostat by means of which the actuating means for the valve and the ignition means, is operated.

Fig. 2 is a horizontal sectional view on line 2—2 of Fig. 1 showing the valves of both the main burner and the igniting burner closed.

Fig. 5 is a transverse sectional view on line 5—5 of Fig. 2.

Fig. 6 is a diagram of the electrical elements of the invention and the associated mechanical parts.

Fig. 7 is a vertical sectional view through the main and igniting burners and the ignition means for said igniting burner.

Figure 3:
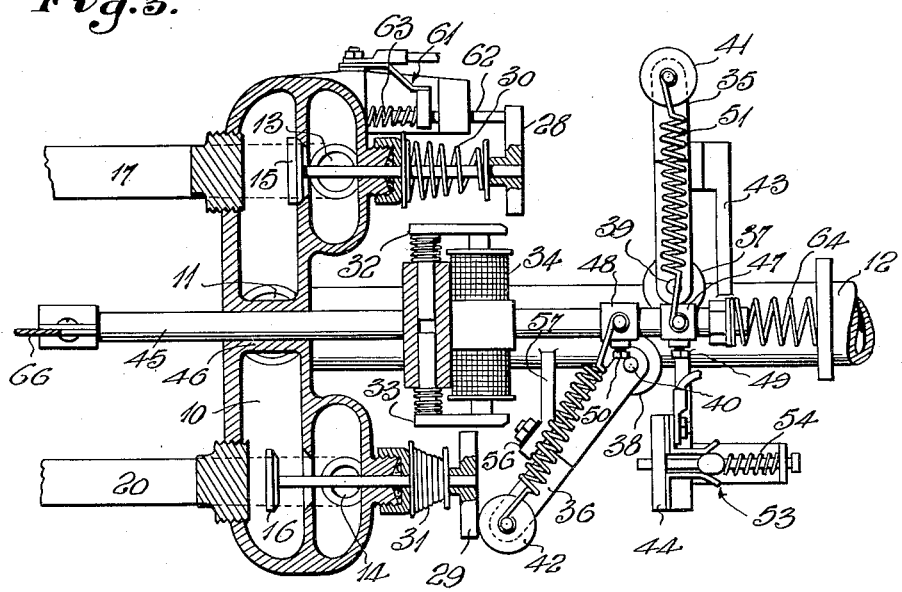
Fig. 3 is a view similar to Fig. 1 but showing the relation of elements when the fuel valve of the igniting burner is opened.

A preferred construction has been shown and will be rather specifically described, with the understanding, however, that within the scope of the invention as claimed, variations may be made.

A valve casing 10 is shown having a fuel inlet 11 to which a fuel supply pipe 12 is rigidly connected, it being intended in the present disclosure that the fuel be of gaseous nature. The casing 10 is provided with two fuel outlets 13 and 14, and two valves 15 and 16 are provided for controlling the flow of fuel from the inlet 11 to said outlets respectively. One pipe 17 leads from the outlet 13 to the main burner 18 for the water heating tank 19, and another pipe 20 leads from the outlet 14 to a small igniting burner 21 for said main burner 18. An electrical ignition device is provided for the burner 21, consisting of spaced electrodes 22 and 23, the latter being insulated at 24 from other metal parts. The electrode 22, however, is grounded to a perforated hood 25 within the confines of the burner 18 and directly above the igniting burner 21. At the proper time, a spark jumps between the electrodes 22 and 23 igniting the fuel discharged from the tip of the igniting burner 21. This having been done, fuel is discharged from the burner 18 and this burner is lighted by means of the flame burning at said burner 21.

The valves 15 and 16 are provided with stems 26 and 27 which extend to the exterior of the casing 10, said stems being disposed at opposite sides of and parallel with the fuel inlet pipe 12. The outer end of the stem 26 is provided with a head 28, and a similar head 29 is provided on the outer end of the stem 27. Coiled springs 30 and 31 surround the stems 26 and 27 respectively and bear against the heads 28 and 29 thereof to move said stems in valve-closing direction, and two spring-applied locking devices 32 and 33 are cooperable with the heads 28 and 29 respectively to lock the valves in closed position, a magnetic releasing coil 34 being provided for releasing both locks when said coil is energized.

Two swingable arms 35 and 36 project in opposite directions from the fuel inlet pipe 12 and are pivoted at their inner ends to bosses 37 and 38 on said pipe, the pivots being shown at 39 and 40. The outer ends of the arms 35 and 36 are provided with rollers 41 and 42 to strike the heads 28 and 29 respectively when said arms are swung toward said heads. One stop 43 is secured to the pipe 12 to limit the movement of the arm 35 away from the head 28, and another stop 44 is secured to said pipe to limit the movement of the arm 36 away from the head 29. An actuating rod 45 extends longitudinally of the pipe 12 and passes through a guide 46 carried by the valve casing 10, said rod 45 being provided with two collars 47 and 48 adjustably secured thereon by set screws 49 and 50, the collar 47 being near the inner end of the arm 35 and the collar 48 near the inner end of the arm 36. Two coiled springs 51 and 52 are connected with the collars 47 and 48 respectively, and extend therefrom longitudinally of the arms 35 and 36, said spring 51 being connected to the outer end of said arm 35 and the spring 52 being connected to the outer end of said arm 36. These springs normally occupy positions with the inner ends thereof sufficiently behind the arm pivots 39 and 40 as to pull rearwardly on the arms, holding them against the stops 43 and 44 respectively. However, when the rod 45 is moved sufficiently forward to move the springs 51 and 52 slightly past dead center, said springs swing the arms 35 and 36 with a snap action, causing their rollers 41 and 42 to abut the heads 28 and 29 respectively, pushing against said heads and opening the valves 15 and 16. The collar 47 is spaced rearwardly to a greater extent from the arm pivot 39 than the collar 48 is spaced rearwardly from the arm pivot 40. Thus, the arm 36 will operate ahead of the arm 35 to open the valve 16 of the igniting burner 21 before the valve 15 of the main burner 18 is opened. I utilize the movement of the arm 36 in valve-opening direction (see Fig. 3) to cause closing of a switch which energizes the coil 34, thereby releasing the locks 32, and I also utilize said movement of said arm 36 to complete a circuit for the electrodes 22, 23. The movement of the arm 35 which opens the valve 15 later, is utilized to open another switch which breaks the ignition circuit and also breaks the circuit of the coil 34, all of which will be better understood after a more extended explanation.

The switch for completing the circuit of the coil 34, is shown at 53, said switch being mounted on the stop 44 in the present disclosure and being normally held in open position by the arm 36 as seen in Fig. 2. As this arm 36 moves in valve-opening direction, however, a spring 54 closes the switch 53, thereby completing the circuit of the coil 34, causing said coil to release the safety locks 32 and 33. Immediately after the arm 36 has opened the valve 16, it strikes a contact 55 which is insulated at 56 from an arm 57 upon which it is carried, said arm being rigidly mounted on the pipe 12. When this occurs, a circuit is completed through the primary winding 58 of an induction coil 59. The high tension current thus induced in the secondary winding 60 of the coil 59 is utilized to create an electric spark between the electrodes 22 and 23, thus igniting the fuel discharged from the burner 21.

Figure 4:
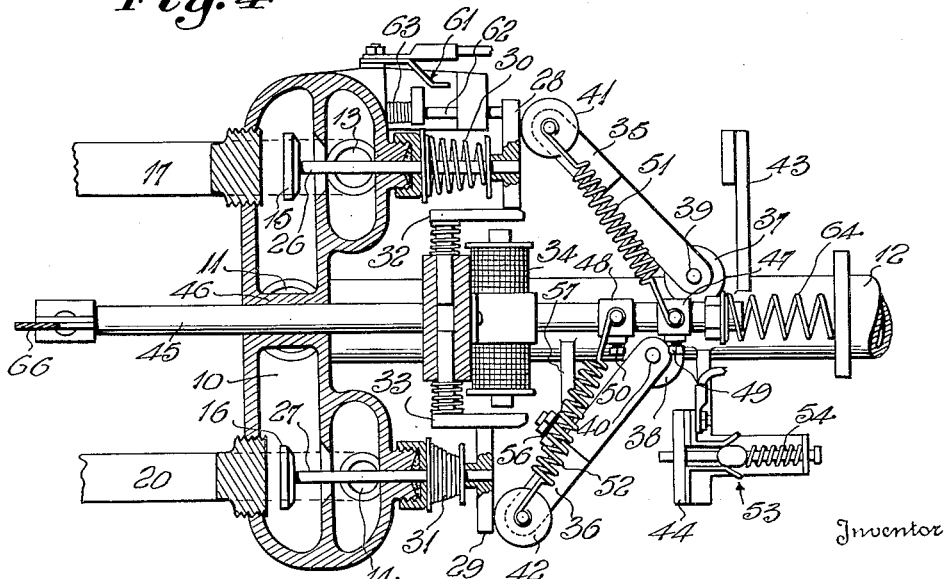
Fig. 4 is a view similar to Figs. 2 and 3 but showing the relation of elements when both fuel valves are opened.

The switch which breaks the ignition circuit and also breaks the circuit of the coil 34, is shown at 61, said switch having a stem 62 cooperable with the valve stem head 28. The switch 61 is normally held closed by a spring 63 and from Fig. 6, it will be seen that the circuit for the electrodes 22, 23, and the circuit for the coil 34, both include said switch 61. When the arm 35 moves to open the valve 15, the head 28 pushes against the switch stem 62, forcing the switch 61 open as seen in Fig. 4, thereby breaking the circuit for the electrodes 22, 23, and the circuit for the coil 34.

The various electrical units of the mechanism, above described, may be wired in any preferred way, and the wiring diagrammatically illustrated in Fig. 6 may be readily traced without specific explanation.

A spring 64 normally tends to move the actuating rod 45 in valve opening direction, and a thermostat 65 in the tank 19 is provided to force said rod 45 in valve closing direction, a suitable system of levers 66 being operatively associated with said rod and thermostat. When the water in the tank 19 drops to a predetermined temperature, the thermostat 65 contracts and the spring 64 moves the rod 45. This rod moves the spring 52 slightly past dead center, causing said spring to rapidly swing the arm 36 from the position of Fig. 2 to that shown in Fig. 3. Just as soon as this arm frees the switch 53, the latter closes, energizing the coil 34 and releasing the valve locks 32 and 33. The arm 36 then effects opening of the valve 16 and finally comes to rest against the contact 55, said arm and contact then cooperating in completing a circuit through the primary coil 58 of the ignition coil 59. The induced high tension current from the secondary 60 then flows through the secondary circuit causing a spark between the electrodes 22 and 23, igniting the fuel discharged from the burner 21. This burner is thus in readiness to ignite the main burner 18. Promptly after these operations have been performed, the arm 35 is swung from the position of Fig. 3 to the position of Fig. 4 by its spring 51, thereby opening the valve 15 to supply fuel to the main burner 18, this fuel being ignited by the burner 21. The valve opening movement of the arm 35 also effects opening of the switch 61, breaking the ignition circuit and the circuit of the coil 34.

When the temperature of the water in the tank 19 has risen sufficiently, expansion of the thermostat 65 causes such operation of the levers 66 as to force the rod 45 outwardly against the action of the spring 64. When sufficient outward movement of this rod has taken place to move the springs 51 and 52 past dead center, said springs restore the arms 35 and 36 to their normal positions. When this occurs, the valves 15 and 16 are closed by their springs 30 and 31, the latches 33 again engage the heads 28 and 29 to lock said valves in closed position, the head 28 permits the switch 61 to again close, and the arm 36 again opens the switch 35, all parts being therefore in readiness for the next operation.

From the foregoing, taken in connection with the accompanying drawings, it will be seen that novel provision has been made for carrying out the objects of the invention, and particular attention is invited to the generally compact, simple, efficient and well-balanced structure. In this latter regard, it will be observed that either spring (51 or 52) exerts a lateral pull on the actuating rod 45 but this pull is counteracted by the corresponding opposite lateral pull exerted on said rod by the other spring, thus preventing either spring from having a tendency to cant the rod and cause binding thereof in its guiding means.

I claim:

1. In combination, a main burner, an igniting burner for said main burner, an electrical ignition device for said igniting burner, two valves for controlling the flow of fuel to said burners respectively, electrically releasable locking means for said valves, valve operating means for first opening the valve of said igniting burner and then opening the valve of said main burner, a releasing circuit for said valve locking means, means for automatically completing said releasing circuit when said valve operating means is about to open said valve of said igniting burner, an ignition circuit for said ignition device, means for automatically closing said ignition circuit when said valve of said igniting burner is opened, and means for automatically breaking both of said circuits when said valve of said main burner is opened.

2. In combination, a main burner, an igniting burner for said main burner, an electrical ignition device for said igniting burner, two valves for controlling the flow of fuel to said burners respectively, pivotally mounted arms for opening said valves, means for operating said arms with a snap action to open said valves, said operating means for said arms being timed to first cause movement of the one arm which opens the valve of said igniting burner and to then cause movement of the other arm which opens the valve of said main burner, an ignition circuit for said ignition device, a switch controlled by said one arm for automatically closing said ignition circuit when said one arm swings to valve-opening position, and a switch controlled by said other arm for automatically breaking said ignition circuit when said other arm swings to valve-opening position.

3. In combination, a main burner, an igniting burner for said main burner, an electrical ignition device for said igniting burner, two valves for controlling the flow of fuel to said burners respectively, pivotally mounted arms for opening said valves, means for operating said arms with a snap action to open said valves, said operating means for said arms being timed to first cause movement of the one arm which opens the valve of said igniting burner and to then cause movement of the other arm which opens the valve of said main burner, electrically releasable locks for said valves, a releasing circuit for said locks, a switch for said releasing circuit controlled by said one arm for automatically effecting lock release when said one arm swings in valve-opening direction, an ignition circuit for said ignition device, a switch for said ignition circuit controlled by said one arm for automatically closing said ignition circuit when said one arm moves in valve-opening direction, and a switch controlled by said other arm for automatically breaking said releasing circuit and said ignition circuit when said other arm swings in valve-opening direction.

4. In combination, a main burner, an igniting burner for said main burner, two valves for controlling the flow of fuel to said burners respectively, pivotally mounted arms operatively associated with said valves for opening the same, snap-action springs connected with said arms for operating the same, said springs normally occupying inactive positions, and means for moving said springs to such positions as to cause them to swing said arms in valve-opening direction, said arm moving means being timed to first swing the arm which opens the valve of said igniting burner and to then swing the arm which opens the valve of said main burner.

5. In a snap-action valve mechanism, a valve casing having a fluid inlet pipe and two fluid outlets, two valves for said outlets respectively, said valves having stems extending to the exterior of said casing in parallel relation with and at opposite sides of said fluid inlet pipe, two arms pivoted to said fluid inlet pipe in position to swing in one direction and inwardly slide said stems, said arms projecting in opposite directions from said fluid inlet pipe, stops on said pipe for limiting the movement of said arms away from said stems, an actuating rod extending longitudinally of said fluid inlet pipe and mounted for longitudinal sliding, a guide for said actuating rod, and two tension springs extending longitudinally of said arms, said springs being connected with said arms and with said actuating rod and normally holding said arms against said stops, the lateral pull of either spring on said rod being balanced by the corresponding opposite pull of the other spring on said rod, said springs being active to swing said arms in valve-operating direction with a snap-action when said actuating rod is slid sufficiently to move said springs past dead-center positions.

6. In a snap-action valve mechanism, a valve casing and a fluid pipe rigid therewith, a valve in said casing for controlling the pipe-conducted fluid, said valve having a stem extending to the exterior of said casing in parallel relation with said pipe, an arm pivoted to said pipe in position to swing in one direction and inwardly slide said stem to operate said valve, a stop on said pipe for limiting the movement of said arm away from said stem, an actuating rod extending longitudinally of said pipe and slidable longitudinally thereof, a guide for said actuating rod, and a tension spring connected with said arm and with said actuating rod and normally holding said arm against said stop, said spring being active to swing said arm in valve-operating direction when said actuating rod is slid sufficiently to move said spring past dead-center position.

7. In a snap-action mechanism, two work-performing arms pivotally mounted on parallel axes and extending substantially in opposite directions from their pivots, means for limiting the movement of said arms in one direction, tension springs for swinging said arms in the other direction, said springs extending substantially longitudinally of said arms and being connected at their outer ends with said arms respectively, and an actuator near the inner ends of said arms and mounted for movement transversely of said arms, the inner ends of said springs being connected with said actuator at points spaced in said one direction from the arm pivots, whereby movement of said actuator in said other direction will swing said springs past dead-center position and cause them to swing said arms in said other direction with a snap-action, the lateral pull of either spring on said actuator being balanced by the corresponding opposite lateral pull of the other spring on said actuator.

8. In combination, a main burner, an igniting burner for said main burner, an electrical ignition device for said igniting burner, two valves for controlling the flow of fuel to said burners respectively, two movably mounted operators for opening said valves respectively, means for actuating said operators with a snap-action to open said valves, said actuating means being timed to first cause movement of the one operator which opens the valve of said igniting burner and to then cause movement of the other operator which opens the valve of said main burner, an ignition circuit for said ignition device, a switch controlled by said one operator for automatically closing said ignition circuit when said one operator moves to valve-opening position, and a switch controlled by said other operator for automatically breaking said ignition circuit when said other operator moves to valve-opening position.

9. In combination, a main burner, an igniting burner for said main burner, an electrical ignition device for said igniting burner, two valves for controlling the flow of fuel to said burners respectively, two movably mounted operators for opening said valves respectively, means for actuating said operators with a snap-action to open said valves, said actuating means being timed to first cause movement of the one operator which opens the valve of said igniting burner and to then cause movement of the other operator which opens the valve of said main burner, electrically releasable locks for said valves, a releasing circuit for said locks, an ignition circuit for said ignition device, switch means for said releasing and ignition circuits controlled by said one operator for automatically effecting lock release and ignition when said one operator moves in valve-opening direction, and a switch controlled by said other operator for automatically breaking said releasing and ignition circuits when said other operator moves in valve-opening direction.

10. In a fuel controlling and burner igniting means, a main burner fuel valve, an igniting burner fuel valve; actuating mechanism for said valves, said actuating mechanism having one portion movable in one direction to effect opening of said igniting burner valve and movable in the other direction to effect closing of said igniting burner valve; said actuating mechanism also having a second portion movable in one direction to effect opening of said main burner valve and movable in the other direction to effect closing of said main burner valve; said actuating mechanism also having separate spring means for first actuating said one portion with a snap action and then actuating said second portion with a snap action, and means for causing said spring means to operate said portions in either direction; one ignition circuit switch for said igniting burner under the control of said one portion to close when said one portion snaps in valve-opening direction and to open when said one portion snaps in valve-closing direction; and a second ignition circuit switch under the control of said second portion to open when said second portion snaps in valve-opening direction and to close when said second portion snaps in valve-closing direction.

11. In a fuel controlling and burner igniting means, a main burner valve, a lighting burner valve, an electrical lighting burner igniting device, thermostatically-controlled actuating means for said valves, locks for locking both of said valves against opening until said locks are released, electrical-releasing means for said locks, and switch means under the control of said thermostatically-controlled actuating means for conducting current from the same source to both said electrical igniting device and said electrical lock-releasing means, whereby if the current should be off and cannot operate said electrical igniting device when said thermostatically-controlled valve-actuating means attempts to open said valves, said locks will prevent valve-opening and escape of fuel through either of said valves.

12. In a fuel-controlling and burner-igniting means, valve means for the burner fuel, actuating mechanism for said valve means movable in valve-opening direction and in valve-closing direction, said valve-actuating mechanism including spring means for moving it in either of said directions with a snap-action, means for causing said spring means to move said valve-actuating mechanism in either of said directions, and a burner ignition circuit having a circuit-closing switch actuated by said valve-actuating mechanism to close when said mechanism snaps in valve-opening direction and vice versa, said circuit also having a circuit-breaking switch actuated by said valve-actuating mechanism to open when said mechanism has opened said valve means and to close when said mechanism snaps in valve-closing direction.

13. In a fuel-controlling and burner-igniting means, valve means for controlling the burner fuel, electrically-released locking means for normally preventing opening of said valve means, actuating mechanism for said valve means movable in valve-opening direction and in valve-closing direction, said valve-actuating mechanism including spring means for moving it in either of said directions with a snap-action, means for causing said spring means to move said valve-actuating mechanism in either of said directions, an ignition circuit having a circuit-closing switch actuated by said valve-actuating mechanism to close when said mechanism snaps in valve-opening direction and vice versa, said ignition circuit also having a circuit-breaking switch actuated by said valve-actuating mechanism to open when said mechanism has opened said valve means and to close when said mechanism snaps in valve-closing direction, and circuit-controlling means for said electrically-released locking means having a third switch actuated by said valve-actuating mechanism to close when said mechanism snaps in valve-opening direction and to open when said mechanism snaps in valve-closing direction.

14. In a fuel-controlling and burner-igniting means, valve means for controlling the burner fuel, electrically-released locking means for normally preventing opening of said valve means, actuating mechanism for said valve means movable in valve-opening direction and in valve-closing direction, said valve-actuating mechanism including spring means for moving it in either of said directions with a snap-action, means for causing said spring means to move said valve-actuating mechanism in either of said directions, and circuit-controlling means for said electrically-released locking means including a switch actuated by said valve-actuating mechanism to close when said mechanism snaps in valve-opening direction and to open when said mechanism snaps in valve-closing direction.

JAMES E. BROWNING.